Figure 1:
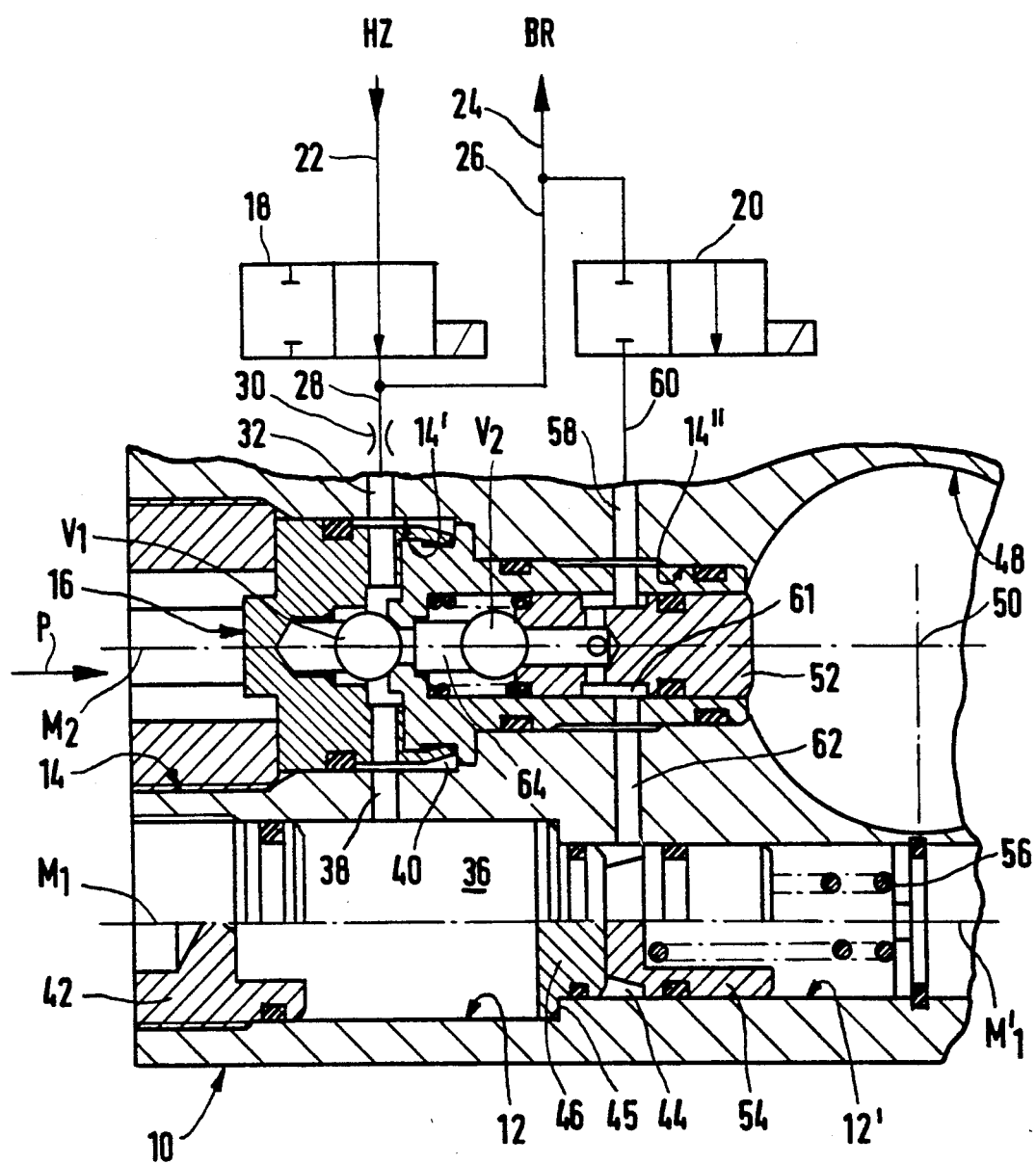

United States Patent [19]

Glasmacher

[11] Patent Number: 5,236,253
[45] Date of Patent: Aug. 17, 1993

[54] PRESSURE CONTROL DEVICE FOR AN ANTI-LOCK AND/OR ANTI-SLIP SYSTEM

[75] Inventor: Klaus Glasmacher, Koblenz, Fed. Rep. of Germany

[73] Assignee: Lucas Industries public limited company, Solihull, England

[21] Appl. No.: 765,178

[22] Filed: Sep. 26, 1991

[51] Int. Cl.5 .......................... B60T 8/40; B60T 17/04
[52] U.S. Cl. .................................... 303/87; 303/113.2; 303/116.4
[58] Field of Search ............... 303/116 PC, 113 TR, 303/113 R, 116 R, 116 SP, 87, 119 SV, 116.4, 113.2, 113.1, 116.1, 116.2, 119.2

[56] References Cited

U.S. PATENT DOCUMENTS

| 4,387,934 | 6/1983 | Farr | 303/116 PC |
|---|---|---|---|
| 4,953,918 | 9/1990 | Hashida et al. | 303/116 PC |
| 4,983,100 | 1/1991 | Budecker | 303/87 X |
| 4,988,147 | 1/1991 | Zirps | 303/10 X |
| 4,988,148 | 1/1991 | Farr et al. | 303/116 PC |
| 5,009,581 | 4/1991 | Kushiyamma et al. | 303/87 X |
| 5,035,469 | 7/1991 | Geilen et al. | 303/87 |
| 5,039,283 | 8/1991 | Mergenthaler et al. | 303/87 X |

FOREIGN PATENT DOCUMENTS 379957 8/1990 European Pat. Off. .

Primary Examiner—Robert J. Oberleitner
Assistant Examiner—Peter M. Poon
Attorney, Agent, or Firm—Oblon, Spivak, McClelland, Maier & Neustadt

[57] ABSTRACT

A pressure control device for an anti-lock and/or anti-slip system of a motor vehicle comprises a valve casing (10) in which a damping chamber (36) and an expansion chamber (44) are arranged in a common recess (12, 12'), the two chambers having a common axis. A pump is disposed in an adjacent recess having an axis parallel to the common axis of the chambers whereby substantial space is saved over prior arrangements.

4 Claims, 2 Drawing Sheets

PRESSURE CONTROL DEVICE FOR AN ANTI-LOCK AND/OR ANTI-SLIP SYSTEM

The invention relates to a pressure control device for an anti-lock and/or anti-slip system in a motor vehicle, comprising a valve casing which is embodied by a block and to which at least two valves are connected and which is formed with recesses to house at least one hydraulic fluid pump, one expansion chamber, and one damping chamber, respectively.

A pressure control device of that kind is known from EP 0 379 957 (corresponding to DE 89 00 706.9 U). In the known case, the reservoir and damping chambers of a pressure control device for ABS controls are arranged such that at least one of these chambers is formed in a common bore with an associated accomodation for a valve.

The cited publication already mentions that it is a special aim in designing ABS controls to construct components which require as little space as possible. The instant invention is aimed at solving the same problem.

Pressure control devices of the kind in question for ABS controls are used in multi-circuit brake systems, above all in dual circuit brake systems, and they comprise a valve casing in which accommodation is provided for a pair of control valves as well as for a reservoir chamber and a damping chamber for each brake circuit. The reservoir chambers each are associated with a wheel brake cylinder adapted to be connected to the pressure control device, and it is their task to take up brake fluid from the corresponding wheel brake cylinder so as to relieve it of pressure when a risk of locking exists. It is because of this function that the reservoir chambers frequently are referred to as expansion chambers, as is the case here. A return pump is connected to each of the expansion chambers to return the hydraulic fluid (brake fluid) temporarily received by the expansion chambers in the event of an ABS control operation to the master cylinder. The damping chamber is connected, in the conveying direction of the pump, to conduits for the hydraulic fluid to level out pressure peaks caused by the stroke of the pump. All this may be gathered from the prior art cited above.

It is known from DE 26 43 860 A1 to connect the damping chamber mentioned downstream of the pump.

It is the object of the instant invention to devise a pressure control device of the kind defined initially such that its structure is space saving and that it can be manufactured economically.

The object is met, in accordance with the invention, in that the damping chamber and the expansion chamber are arranged in a common recess in the valve casing.

The recess preferably is embodied by bores formed in the valve casing so as to have a common central axis.

According to another preferred modification of the invention the hydraulic fluid pump is disposed in an elongated recess in the valve casing, the central axis of this recess extending parallel to the central axis of the recess for the damping and expansion chambers.

Further saving of space for the pressure control device is achieved if the valves are arranged in recesses whose central axes extend at right angles to the central axes of the recesses both for the damping and expansion chambers and for the hydraulic fluid pump.

The invention provides more than 15% of further saving of structural volume as compared to the most pertinent prior art in respect of a valve casing comprising structural members that carry out a plurality of functions disclosed in EP 0 379 957 A1. . In addition, not only the manufacture of the valve casing is simplified but also the assembly of the various components.

Figure 2:
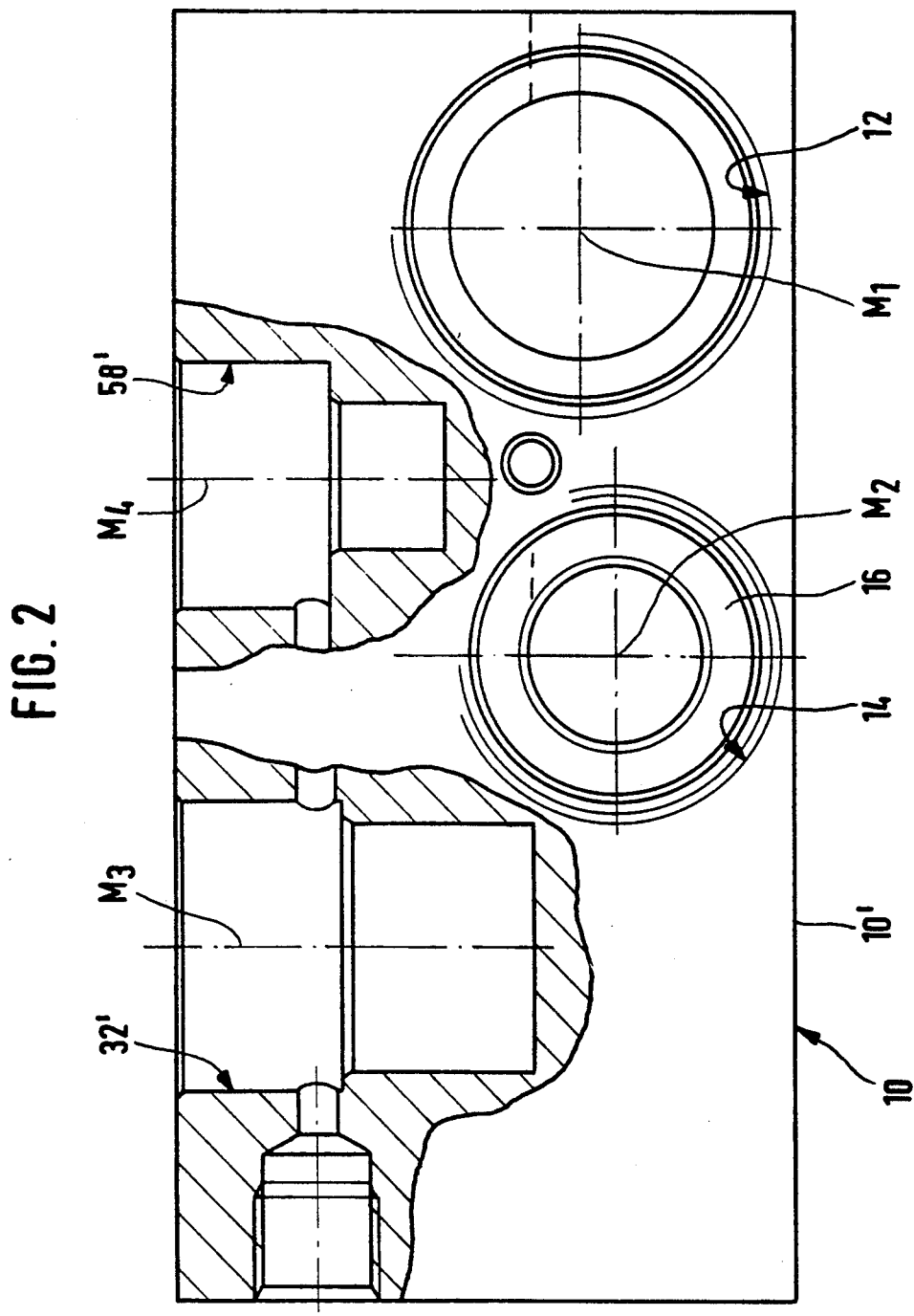

An embodiment of the invention will be described in greater detail below with reference to the drawings, in which:

FIG. 1 is a diagrammatic sectional view of a valve casing for a pressure control device of an anti-lock control system and FIG. 2 is a diagrammatic presentation of the valve casing of FIG. 1 as seen in the direction of arrow P.

As shown in the figures, a valve casing 10 is made in the shape of an integral metal block formed with a plurality of recesses and bores to house various components and with chambers and passages.

The figures show a valve casing 10 intended for a single brake circuit of a dual circuit brake system. The second brake circuit of this system can be controlled from a corresponding valve casing (not shown) formed integrally with the valve casing 10 illustrated in FIGS. 1 and 2 and housing all the components of the second brake circuit in analogous manner.

The valve casing 10 has recesses 12, 12' which are each formed as a bore in the block which constitutes the casing.

Recess 12 has a somewhat greater diameter than recess 12'. The bores presenting the two recesses 12, 12' have a common central axis $M_1$, $M'_1$. This means that during manufacture of the valve casing 10 the block is formed with a through bore so that at first a continuous (uninterrupted) opening is obtained into which structural elements (see below) are inserted later on to form different chambers (see below) in the continuous through bore.

The block of valve casing 10 is formed with another elongated recess 14, 14', 14" in parallel with the central axis $M_1$ of the recesses 12, 12'. As shown in FIG. 1, this recess, too, consists of several bores of different diameters passing over one into the other and having a common central axis $M_2$. A pump 16 for hydraulic fluid (brake fluid) is inserted in the recesses 14, 14', 14". This hydraulic fluid pump 16 corresponds to the state of the art. It is a piston pump driven by a cam and comprising suction and pressure valves. The pump 16 intermittently conveys brake fluid, as will be described in greater detail below.

Furthermore, two valves 18, 20, indicated only diagrammatically in FIG. 1 for the sake of clarity, are built into the valve casing 10. The actual installation of the valves 18, 20 in the valve casing 10 is shown more clearly in FIG. 2 (see below).

The pressure control device according to FIG. 1 in per se known manner presents a so-called "dual magnetic valve system" in which two magnetic valves are provided per brake channel.

The magnetic valve 18 normally is open, i.e. the valve is open when no current flows through the coil of the magnetic valve 18 (as shown in FIG. 1) so that pressurized hydraulic fluid will flow from the master cylinder HZ of the brake system through conduits 22, 26, and 24 to the brake cylinder BR of the wheel brake which is under anti-lock control. The condition with the magnetic valve 18 in open state and the magnetic valve 20 in closed state corresponds to "normal" braking, i.e. braking without anti-lock or anti-slip control.

If, on the other hand, anti-lock or anti-slip control must be effected magnetic valve 18 closes, while magnetic valve 20 now is energized electrically so that it will open. Thereafter pressurized brake fluid can expand from the brake cylinder BR through conduit 24 and valve 20 into an expansion chamber (see below) in order to reduce the brake torque at the retarded wheel and overcome the risk of locking.

If rotational speed sensors (not shown) mounted at the retarded wheel determine that the risk of locking has been overcome the brake fluid in the brake cylinder BR of the retarded wheel is pressurized once more. At the same time the pump 16 conveys hydraulic fluid through a conduit 28, a throttle 30, and a passage 32 formed in the valve casing 10 back into the master cylinder HZ.

A per se known damping chamber 36 communicating with the passage 32 through a passage 38 is provided in per se known manner at the pressure end of the pump 16 in order to smooth any pressure peaks in the brake fluid caused by the periodic piston stroke. This communication is enhanced further by a surrounding annular space 40.

The damping chamber 36 is defined in the recess 12 of the valve casing 10. As shown in FIG. 1, the damping chamber 36 is limited to the left by a closure member 42 mounted in the casing 10. At the side opposite the closure member 42 the damping chamber 36 is defined by a partitioning cover 46 which is pressed against a stop 45 resulting from the different diameters of the recess 12 and 12'. To the right of the partitioning cover 46 in FIG. 1 the expansion chamber 44 already mentioned is formed as an annular space. The function of the expansion chamber 44 is known as such in the art and it serves to take up hydraulic fluid upon relief of the pressure prevailing in the brake cylinder BR.

The valve casing 10 further includes a recess 48 for an electric motor (not shown) which likewise is known per se and acts on a plunger 52 of the pump 16 by way of a cam (not shown). The central axis 50 of the electric motor is coaxial with the central axis of the recess 48 which is of circular cylindrical shape.

As shown in FIG. 1, the expansion chamber 44 presented in the recess 12' which was formed as a bore is defined at the right by a reciprocating piston 54 which is biased to the left by a spring 56, whereby the expansion chamber 44 may grow in volume as compared to what is illustrated in FIG. 1.

Pressure relief of the hydraulic fluid in the brake cylinder BR in the event of an ABS control cycle is accomplished by way of a conduit 60 and a passage 58 as well as an annular space 61 and another passage 62 leading through the valve casing 10 to the expansion chamber 44.

Upon actuation of the electric motor and with the periodic beating of the cam (not shown) on the plunger 52 of the pump 16, the latter conveys the hydraulic fluid from the expansion chamber 44 to the conduit 28 of the master cylinder HZ, as known per se.

In per se known manner, the pump 16 comprises two return valves $V_1$ and $V_2$ and the pressure end of the pump is formed by a chamber 64.

Due to the one-way valves mentioned, the pressure is higher in the damping chamber 36 than in the expansion chamber 44 so that the partitioning cover 46 need not be pressed against the stop 45 by extra mechanical means. Also, when the magnetic valve is open normally and the pump is not working the cover 46 likewise is subjected to the master cylinder pressure.

The arrangement of the recesses for the damping and expansion chambers and for the pump 16 shown in FIG. 1 with the mutually parallel central axes $M_1$, $M'_1$, $M_2$ and the perpendicular arrangement of the central axis 50 of the electric motor with respect to the central axis $M_2$ of the pump 16 permits a structure of the pressure control device which is especially space saving.

In FIG. 1 the location of the valves 18 and 20 with respect to the valve casing 10 is shown only diagrammatically, i.e. it is not geometrically precise.

The precise arrangement of the valves 18 and 20 with respect to the valve casing 10 may be taken from FIG. 2 which shows the valve casing of FIG. 1 in the direction of arrow P (FIG. 1).

As FIG. 2 shows, the recesses 12, 14 are located parallel to each other close to a lower edge 10' of the valve casing 10 which is formed like a block. The passages 32 and 58 indicated only schematically in FIG. 1 are illustrated precisely in FIG. 2, their reference numerals each being given a prime. To accommodate the valves 18, 20, the passsages 32', 58' are formed in the valve casing 10 in such manner that their central axes $M_3$, $M_4$ each extend vertically with respect to the central axes $M_1$, $M_2$ of the recesses 12 and 14, respectively, for the chambers and the pump, respectively. This provides further space saving, and the valves 18, 20 may be accommodated in spacesaving manner in the valve casing 10. It also follows from the above that the central axes $M_1$, $M'_1$ of the damping and expansion chambers extend at right angles to the central axis 50 of the electric motor 50.

The embodiment of the invention illustrated in FIG. 1 may be modified particularly so that the input conduit 26 will not branch off from conduit 28 but instead from conduit 22, in other words upstream of the magnetic valve. That guarantees that the master cylinder never will be shut off.

What is claimed is:

1. A pressure control device for an anti-lock and/or anti-slip system in a motor vehicle, comprising a valve casing (10) which is embodied by a block and to which at least two valves (18, 20) are connected and which is formed with recesses to house at least one hydraulic fluid pump (16), one expansion chamber (44), and one damping chamber (36), respectively, characterized in that the damping chamber (36) and the expansion chamber (44) are arranged in a common recess (12, 12') and having a common central axis located in said common recess in the valve casing (10).

2. The pressure control device as claimed in claim 1, characterized in that the recess for the damping and expansion chambers is constituted by bores (12, 12') formed in the valve casing (10).

3. The pressure control device as claimed in claim 2, characterized in that the hydraulic fluid pump (16) is housed in a recess (14, 14', 14") formed in the valve casing (10) and having a central axis ($M_2$) which extends parallel to the central axis ($M_1$) of the recess (12, 12') for the damping and expansion chambers.

4. The pressure control device as claimed in claim 3, characterized in that the valves (18, 20) are disposed in recesses (32', 58') whose central axes ($M_3$, $M_4$) extend perpendicular to the central axes ($M_1$, $M_2$) of the recesses (12, 14) for the damping and expansion chambers (36, 44) and for the hydraulic fluid pump (16), respectively.

* * * * *